(12) United States Patent
Won et al.

(10) Patent No.: US 11,570,704 B2
(45) Date of Patent: Jan. 31, 2023

(54) METHOD AND APPARATUS FOR MANUALLY SELECTING A NETWORK

(71) Applicant: NOKIA TECHNOLOGIES OY, Espoo (FI)

(72) Inventors: Sung Hwan Won, Flower Mound, TX (US); György Tamás Wolfner, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/036,729

(22) Filed: Sep. 29, 2020

(65) Prior Publication Data
US 2021/0136673 A1 May 6, 2021

(30) Foreign Application Priority Data
Oct. 30, 2019 (GB) .................................... 1915748

(51) Int. Cl.
*H04W 48/18* (2009.01)
*H04W 60/00* (2009.01)
(52) U.S. Cl.
CPC ........... *H04W 48/18* (2013.01); *H04W 60/00* (2013.01)
(58) Field of Classification Search
CPC ... H04W 48/18; H04W 60/00; H04W 84/045; H04W 60/04
See application file for complete search history.

(56) References Cited

U.S. PATENT DOCUMENTS

| | | | | |
|---|---|---|---|---|
| 2018/0176768 A1* | 6/2018 | Baek | ..................... | H04W 8/205 |
| 2020/0314732 A1* | 10/2020 | Park | ..................... | H04W 76/11 |
| 2020/0329524 A1* | 10/2020 | Park | ..................... | H04W 72/042 |
| 2020/0351755 A1* | 11/2020 | Huang-Fu | ............. | H04W 8/186 |
| 2020/0389835 A1* | 12/2020 | Talebi Fard | .......... | H04W 12/76 |
| 2021/0092707 A1* | 3/2021 | Ryu | ........................ | H04W 8/24 |
| 2021/0092708 A1* | 3/2021 | Ryu | ..................... | H04W 68/02 |
| 2021/0092725 A1* | 3/2021 | Park | ..................... | H04W 92/12 |
| 2021/0184875 A1* | 6/2021 | Qiao | ..................... | H04W 76/18 |

FOREIGN PATENT DOCUMENTS

WO 2019030569 A1 2/2019

OTHER PUBLICATIONS

International Search Report and Written Opinion dated Dec. 2, 2020 corresponding to International Patent Application No. PCT/FI2020/050572.

(Continued)

*Primary Examiner* — Marcus Hammonds
(74) *Attorney, Agent, or Firm* — Alston & Bird LLP (57) ABSTRACT

A method comprising: determining, by a user equipment, that a non-closed access group cell is available to the user equipment in a public land mobile network, wherein the public land mobile network is identified by a public land mobile network identity and the user equipment is only allowed to access the public land mobile network via one or more closed access group cells; displaying the public land mobile network identity to a user; receiving user input selecting the public land mobile network identity; and transmitting a registration request to the public land mobile network identified by the public land mobile network identity.

18 Claims, 6 Drawing Sheets

(56) References Cited

OTHER PUBLICATIONS

3GPP TS 23.122 V16.3.0 (Sep. 2019), Technical Specification, 3rd Generation Partnership Project; Technical Specification Group Core Network and Terminals; Non-Access-Stratum (NAS) functions related to Mobile Station (MS) in idle mode (Release 16), Sep. 24, 2019.
Huawei et al, "Addition of new Substrate SNPN-Search," C1-196222, 3GPP TSG-CT WG1 Meeting #120, Portoroz, Slovenia, Oct. 7-11, 2019, Sep. 30, 2019.
Huawei et al, "Presentation of PLMN with non-CAG cells for manual selection," C1-201020, 3GPP TSG-CT WG1 Meeting #122, Electronic meeting, Feb. 20-28, 2020, Mar. 5, 2020.
Samsung, "Subscription update for CAG only UEs," C1-200586, 3GPP TSG-CT WG1 Meeting #121, Reno, Nevada, Nov. 11-15, 2019, Feb. 17, 2020.
Office Action for Australian Application No. 2020373330 dated Nov. 24, 2022, 3 pages.
"3rd Generation Partnership Project; Technical Specification Group Core Network and Terminals; Non-Access-Stratum (NAS) functions related to Mobile Station (MS) in idle mode (Release 16)", 3GPP TS 23.122 v16.7.0, (Sep. 2020), 83 pages.

* cited by examiner

METHOD AND APPARATUS FOR MANUALLY SELECTING A NETWORK

TECHNICAL FIELD

The present disclosure relates to an apparatus, a method, and a computer program and in particular but not exclusively for an apparatus, methods and computer programs for manually selecting a network.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

STATEMENT OF INVENTION

According to an aspect, there is provided a method comprising determining, by a user equipment, that a non-closed access group cell is available to the user equipment in a public land mobile network, wherein the public land mobile network is identified by a public land mobile network identity and the user equipment is only allowed to access the public land mobile network via one or more closed access group cells; displaying the public land mobile network identity to a user; receiving user input selecting the public land mobile network identity; and transmitting a registration request to the public land mobile network identified by the public land mobile network identity.

The public land mobile network identity may be stored in a list comprising one or more public land mobile network identities, wherein for each public land mobile network identity there is an associated zero or more closed access group identities which the user equipment is allowed to use in the public land mobile network identified by the public land mobile network identity.

For each public land mobile network identity, there may be an indication that the user equipment is only allowed to access a 5G system via closed access group cells.

The displayed public land mobile network identity may be associated with an indication that a user equipment is only allowed to access the public land mobile network identified by the public land mobile network identity via one or more closed access group cells.

The method may comprise receiving a registration accept message; and deleting the indication that the user equipment is only allowed to access a 5G system via closed access group cells for the public land mobile network identified by the public land mobile network identity.

The method may comprise receiving a registration reject message; and retaining the indication that the user equipment is only allowed to access 5G system via closed access group cells.

Displaying the public land mobile network identity may comprise displaying the public land mobile network identity associated with a list of one or more closed access group identities, wherein there exists a closed access group cell available to a user equipment in the public land mobile network identified by the public land mobile network identity, and wherein for each of the closed access group identities, it is indicated whether the user equipment is allowed for the closed access group identity.

The list comprising the one or more closed access group identities may include a closed access group identity field, which is either populated with a respective closed access group identity if the entry has a closed access group identity, or is populated with an entry indicating a null closed access group identity if the entry does not have a closed access group identity.

The method may comprise displaying the public land mobile network identity without a list of one or more closed access group identities in addition to the public land mobile network identity displayed with a list of one or more closed access group identities.

According to an aspect, there is provided an apparatus comprising means for determining that a non-closed access group cell is available to the user equipment in a public land mobile network, wherein the public land mobile network is identified by a public land mobile network identity and the user equipment is only allowed to access the public land mobile network via one or more closed access group cells; displaying the public land mobile network identity to a user; receiving user input selecting the public land mobile network identity; and transmitting a registration request to the public land mobile network identified by the public land mobile network identity.

The public land mobile network identity may be stored in a list comprising one or more public land mobile network identities, wherein for each public land mobile network identity there is an associated zero or more closed access group identities which the user equipment is allowed to use in the public land mobile network identified by the public land mobile network identity.

For each public land mobile network identity, there may be an indication that the user equipment is only allowed to access a 5G system via closed access group cells.

The displayed public land mobile network identity may be associated with an indication that a user equipment is only allowed to access the public land mobile network identified by the public land mobile network identity via one or more closed access group cells.

The means may further configured to perform receiving a registration accept message; and deleting the indication that the user equipment is only allowed to access a 5G system via closed access group cells for the public land mobile network identified by the public land mobile network identity.

The means may further configured to perform receiving a registration reject message; and retaining the indication that the user equipment is only allowed to access 5G system via closed access group cells.

Displaying the public land mobile network identity may comprise displaying the public land mobile network identity associated with a list of one or more closed access group identities, wherein there exists a closed access group cell available to a user equipment in the public land mobile network identified by the public land mobile network identity, and wherein for each of the closed access group identities, it is indicated whether the user equipment is allowed for the closed access group identity.

The list comprising the one or more closed access group identities may include a closed access group identity field, which is either populated with a respective closed access group identity if the entry has a closed access group identity, or is populated with an entry indicating a null closed access group identity if the entry does not have a closed access group identity.

The means may further configured to perform displaying the public land mobile network identity without a list of one or more closed access group identities in addition to the public land mobile network identity displayed with a list of one or more closed access group identities.

According to an aspect, there is provided an apparatus comprising at least one processor; and at least one memory including computer program code, the at least one memory and computer program code configured to, with the at least one processor, cause the apparatus to perform: determining that a non-closed access group cell is available to a user equipment in a public land mobile network, wherein the public land mobile network is identified by a public land mobile network identity and the user equipment is only allowed to access the public land mobile network via one or more closed access group cells; displaying the public land mobile network identity to a user; receiving user input selecting the public land mobile network identity; and transmitting a registration request to the public land mobile network identified by the public land mobile network identity.

The public land mobile network identity may be stored in a list comprising one or more public land mobile network identities, wherein for each public land mobile network identity there is an associated zero or more closed access group identities which the user equipment is allowed to use in the public land mobile network identified by the public land mobile network identity.

For each public land mobile network identity there may be an indication that the user equipment is only allowed to access a 5G system via closed access group cells.

The displayed public land mobile network identity may be associated with an indication that a user equipment is only allowed to access the public land mobile network identified by the public land mobile network identity via one or more closed access group cells.

The apparatus may be further configured to perform: receiving a registration accept message; and deleting the indication that the user equipment is only allowed to access a 5G system via closed access group cells for the public land mobile network identified by the public land mobile network identity.

The apparatus may be further configured to perform: receiving a registration reject message; and retaining the indication that the user equipment is only allowed to access 5G system via closed access group cells.

Displaying the public land mobile network identity may comprise displaying the public land mobile network identity associated with a list of one or more closed access group identities, wherein there exists a closed access group cell available to a user equipment in the public land mobile network identified by the public land mobile network identity, and wherein for each of the closed access group identities, it is indicated whether the user equipment is allowed for the closed access group identity.

The list comprising the one or more closed access group identities may include a closed access group identity field, which is either populated with a respective closed access group identity if the entry has a closed access group identity, or is populated with an entry indicating a null closed access group identity if the entry does not have a closed access group identity.

The apparatus may be further configured to perform: displaying the public land mobile network identity without a list of one or more closed access group identities in addition to the public land mobile network identity displayed with a list of one or more closed access group identities.

According to an aspect, there is provided a non-transitory computer readable storage medium comprising computer readable instructions, which when run by at least one processor, cause an apparatus to determine that a non-closed access group cell is available to the user equipment in a public land mobile network, wherein the public land mobile network is identified by a public land mobile network identity and the user equipment is only allowed to access the public land mobile network via one or more closed access group cells; display the public land mobile network identity to a user; receive user input selecting the public land mobile network identity; and transmit a registration request to the public land mobile network identified by the public land mobile network identity.

According to an aspect, there is provided a computer program comprising instructions for causing an apparatus to perform at least determining that a non-closed access group cell is available to the user equipment in a public land mobile network, wherein the public land mobile network is identified by a public land mobile network identity and the user equipment is only allowed to access the public land mobile network via one or more closed access group cells; displaying the public land mobile network identity to a user; receiving user input selecting the public land mobile network identity; and transmitting a registration request to the public land mobile network identified by the public land mobile network identity.

According to an aspect, there is provided an apparatus comprising: determining circuitry for determining that a non-closed access group cell is available to the user equipment in a public land mobile network, wherein the public land mobile network is identified by a public land mobile network identity and the user equipment is only allowed to access the public land mobile network via one or more closed access group cells; displaying circuitry for displaying the public land mobile network identity to a user; receiving circuitry for receiving user input selecting the public land mobile network identity; and transmitting circuitry for transmitting a registration request to the public land mobile network identified by the public land mobile network identity.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
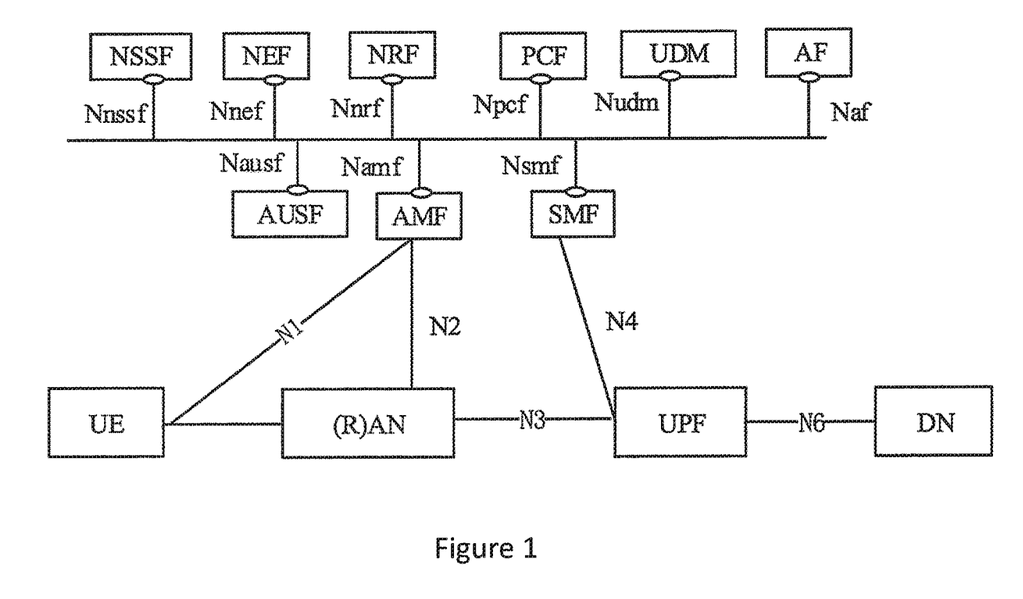
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
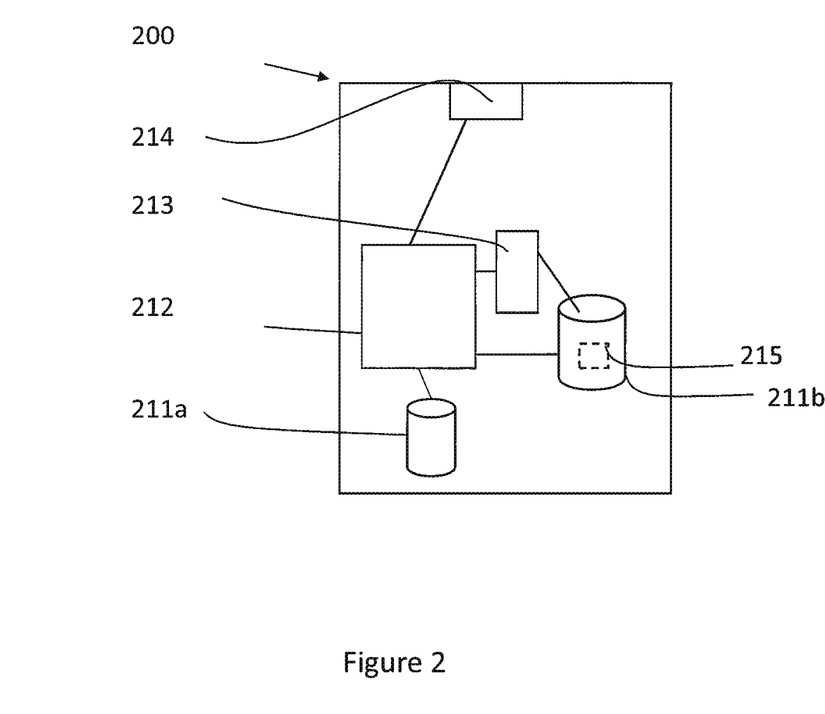
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
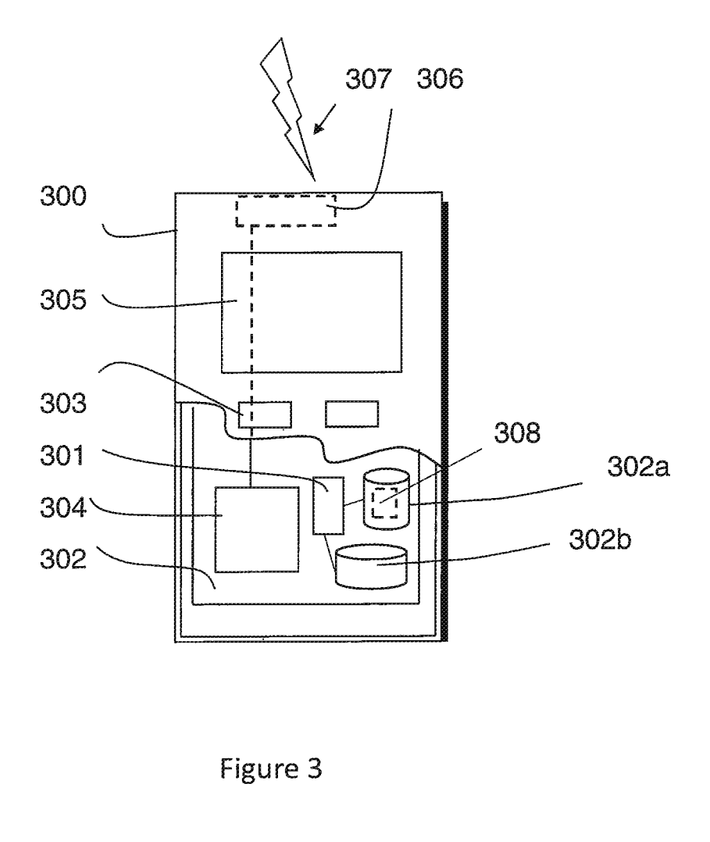
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 311a and the ROM 311b. The at least one processor 301 may be configured to execute an appropriate software code 308. The software code 308 may for example allow to perform one or more of the present aspects. The software code 308 may be stored in the ROM 311b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Certain cells in a wireless communications network may be designated as closed access group (CAG) cells. A CAG defines a limited group of UEs that may access a particular CAG cell or group of cells. UEs outside the CAG may not be able to access the cell(s) in the CAG.

In some cases, manual CAG selection may be permitted. In manual CAG selection, a user may be allowed to manually choose a CAG ID that is not in an allowed CAG list. In order to make this functionality available, the UE may display one or more CAG IDs that are not in the allowed CAG list. The UE may initiate a registration procedure if the user selects a non-allowed CAG ID. If the registration procedure is successful, the UE may add the selected CAG ID to the allowed CAG list.

In some cases, the UE may only be allowed to access a public land mobile network (PLMN) via certain CAG cells. However, a user may select a PLMN that is only allowed be accessed via a CAG that is not in the allowed CAG list. As such, the user may have to be able to select a PLMN without selecting a CAG, even if the UE is only allowed to access the PLMN via CAG cells.

Figure 6:
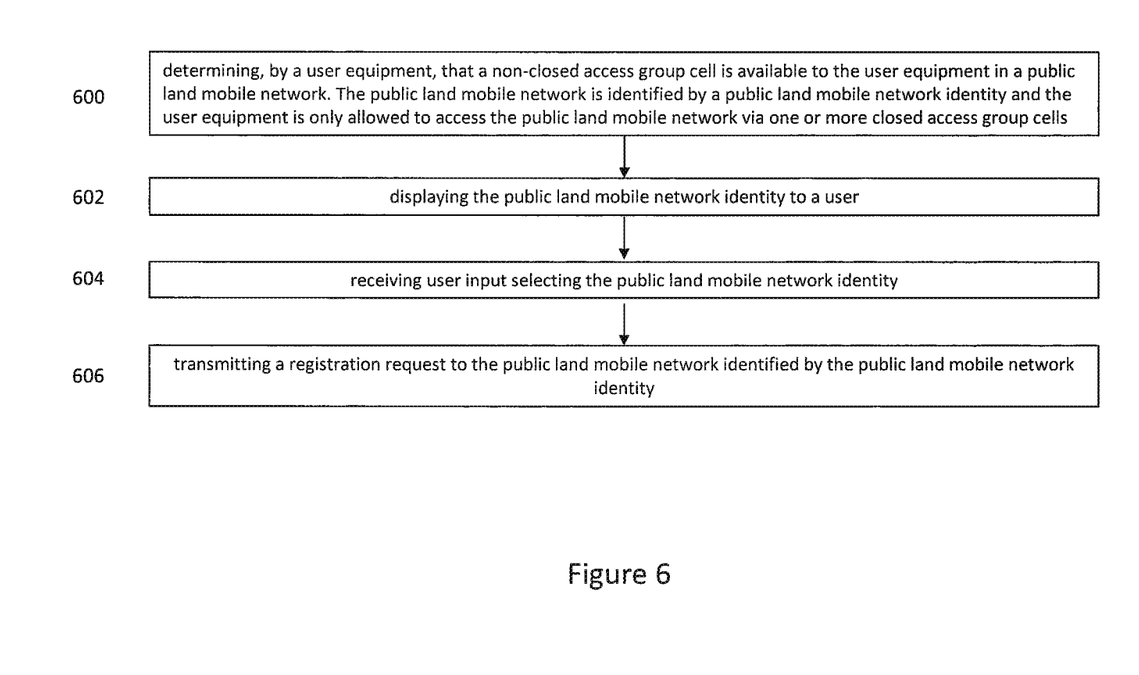
FIG. 6 shows a method according to some example embodiments.

In some example embodiments, there is provided a method as shown in FIG. 6.

At step 600, the method comprises determining, by a user equipment, that a non-closed access group cell is available to the user equipment in a public land mobile network. The public land mobile network is identified by a public land mobile network identity and the user equipment is only allowed to access the public land mobile network via one or more closed access group cells.

At step 602, the method comprises displaying the public land mobile network identity to a user.

At step 604, the method comprises receiving user input selecting the public land mobile network identity.

At step 606, the method comprises transmitting a registration request to the public land mobile network identified by the public land mobile network identity.

Figure 4:
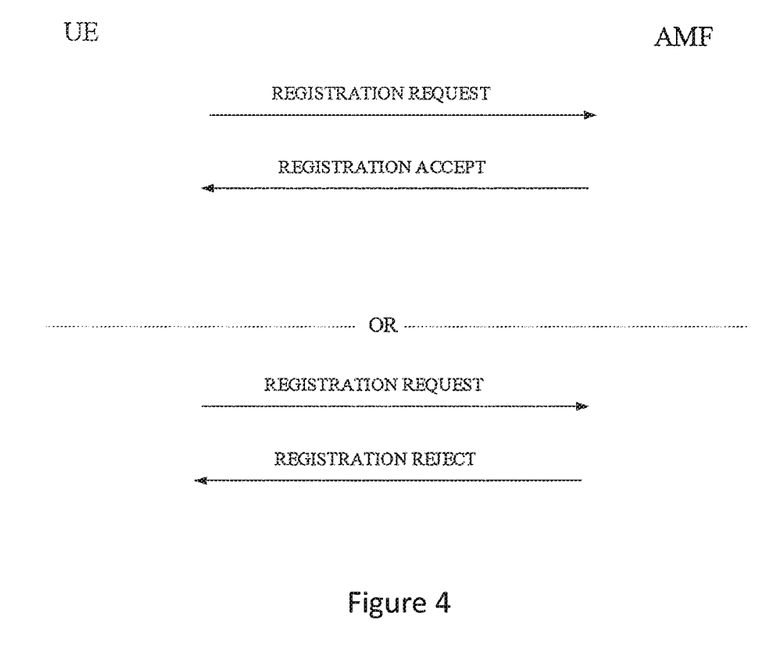
FIG. 4 shows a representation of a registration procedure according to some example embodiments.

An example of a registration procedure according to some example embodiments is shown in FIG. 4.

As shown in FIG. 4, the user equipment transmits, to an access management function (AMF), a message comprising a registration request.

When the registration procedure is successful, the AMF transmits to the user equipment a registration accept message. Or if the registration procedure is not successful, for example if the AMF needs to reject the registration request from the UE, the AMF sends a registration reject message.

In some example embodiments, the displayed information indicating one or more public land mobile networks may indicate which public land mobile networks are available using all supported radio access technologies. PLMNs meeting the criteria above may presented in the following order:
i) if one or more equivalent home public land mobile networks (EHPLMNs) are available, then based on an optional data field on a universal mobile telecommunications system subscriber identification module (USIM) either only the highest priority available EHPLMN is to be presented to the user, or all available EHPLMNs are presented to the user in priority order. Alternatively, if an EHPLMN list is not present or is empty, or if the data field is not present on the USIM, the home public land mobile network (HPLMN) is presented instead of the EHPLMN.
ii) PLMN/radio access technology combinations contained in the USIM, in priority order. The PLMN/radio access technologies may be stored in a "User Controlled PLMN Selector with Access Technology" data file in the USIM;
iii) PLMN/radio access technology combinations contained in the USIM, in priority order. The PLMN/radio access technology combinations may be stored in an "Operator Controlled PLMN Selector with Access Technology" data file in the USIM. Additionally or alternatively, the PLMN/radio access technology combinations may be stored in a mobility engine (ME);
iv) other PLMN/access technology combinations with received a highest quality signal. If more than one PLMN/radio access technology have the same highest signal quality, the more than one PLMN/radio access technologies with the highest signal quality may be displayed in a random order; and
v) other PLMN/radio access technology combinations in order of decreasing signal quality.

In some example embodiments, if the UE supports the CAG feature, and the allowed CAG list comprises at least one entry, then for each PLMN/radio access technology combination of NG-RAN access technology, the UE may display the PLMN/radio access technology combination and a list of one or more CAG identifiers (IDs), such that for each CAG-ID there is an available CAG cell which broadcasts the CAG-ID for the PLMN. In addition, if there exists an entry with the PLMN ID of the PLMN in a "CAG information list" and the CAG-ID is included in the allowed CAG list, the UE may display an indication that the CAG-ID is allowed. Additionally or alternatively, the UE may display whether the CAG-ID is allowed whenever a CAG-ID is displayed.

Alternatively, in some example embodiments the UE may display the PLMN/radio access technology combination without a list of CAG-IDs, if there is an available cell which is not a CAG cell for the PLMN. In addition, if there exists an entry with the PLMN ID of the PLMN in the "CAG information list" including an indication that the UE is only allowed to access 5GS via CAG cells, the UE may present to the user an indication that the UE is only allowed to access 5GS (or the PLMN) via CAG cells. Additionally or alternatively, the UE may display whether the UE is only allowed to access the PLMN via CAG cells whenever a PLMN/radio access technology combination is displayed without a list of CAG-IDs.

In some example embodiments, if there exists both an available CAG cell and an available non-CAG NG-RAN cell for the PLMN, the PLMN/radio access technology combination may be displayed twice: firstly a list of PLMN/radio access technology combinations with CAG-IDs and the secondly a list of PLMN/radio access technology combinations without CAG-IDs.

Alternatively, in some example embodiments the UE may display a list of PLMN/access technology combinations once. The list may include a CAG-ID field, which is either populated with the CAG ID if an entry has a CAG ID, or is populated with an entry indicating a null CAG-ID if the entry does not have a CAG ID.

In some example embodiments, how the UE displays the PLMN/radio access technology combination and a list of CAG-IDs, such that there exists both an available CAG cell and an available non-CAG NG-RAN cell for the PLMN, may be UE implementation specific.

In some example embodiments, the UE may initiate the registration procedure by sending a REGISTRATION REQUEST message to the AMF when either:
  (a) the UE has selected a CAG-ID which is not included in the allowed CAG list for the selected PLMN; or
  (b) a CAG-ID in a PLMN for which the entry in the "CAG information list" does not exist; or
  (c) the UE has selected, without selecting a CAG-ID, a PLMN for which the entry in the "CAG information list" includes an indication that the UE is only allowed to access 5GS via CAG cells.

If the UE has initiated the registration procedure due to manual CAG selection and receives a REGISTRATION ACCEPT message and the UE has initiated the registration procedure in a CAG cell, then the UE may add the selected CAG-ID in the allowed CAG list for the current PLMN (if not already included).

Alternatively, if the UE has initiated the registration procedure due to manual CAG selection and receives a REGISTRATION ACCEPT message and the UE has initiated the registration procedure in a non-CAG cell, then the UE may delete an indication that the UE is only allowed to access 5GS via CAG cells" from the entry of the "CAG information list" for the current PLMN (if any).

In some example embodiments, the AMF may reject a registration request from the UE if the UE does not pass CAG access control. In this case, the AMF can send a REGISTRATION REJECT message and "CAG information list" or part of the "CAG information list". For example, if the UE accesses a PLMN with selecting a CAG-ID which the UE is not allowed to use in the PLMN, the network can send the allowed CAG list for the PLMN together with the REGISTRATION REJECT message.

Figure 5:
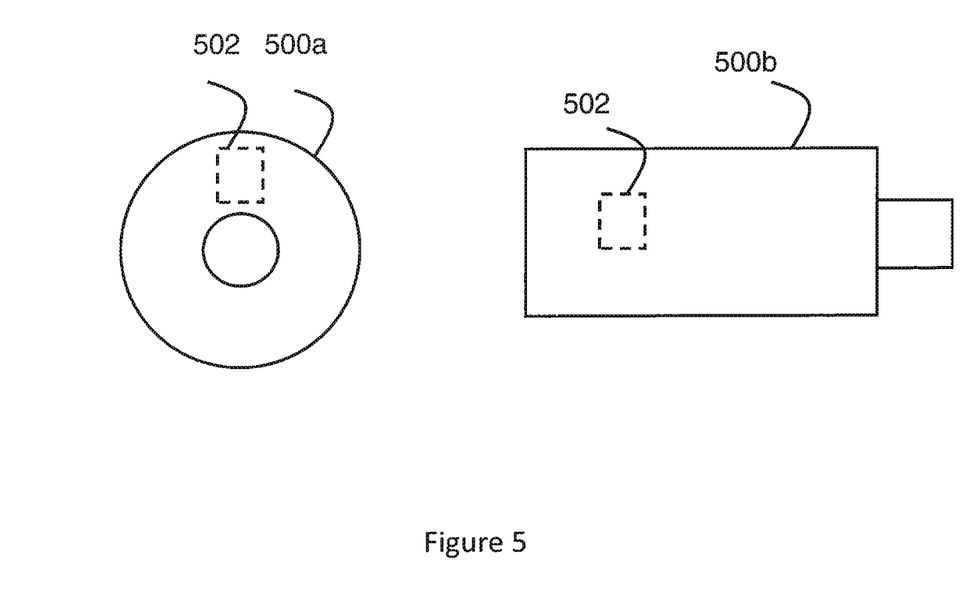
FIG. 5 shows a representation of non-volatile memory media according to some example embodiments.

FIG. 5 shows a schematic representation of non-volatile memory media 500a (e.g. computer disc (CD) or digital versatile disc (DVD)) and 500b (e.g. universal serial bus (USB) memory stick) storing instructions and/or parameters 502 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
   determining, by a user equipment, that a non-closed access group cell is available to the user equipment in a public land mobile network, wherein the public land mobile network is identified by a public land mobile network identity and the user equipment is only allowed to access the public land mobile network via one or more closed access group cells;
   displaying, on the user equipment, the public land mobile network identity for user selection, wherein the displayed public land mobile network identity is associated with an indication that the user equipment is only allowed to access the public land mobile network identified by the public land mobile network identity via one or more closed access group cells;
   receiving a user selection of the public land mobile network identity; and
   based on the received user selection, transmitting a registration request to the public land mobile network identified by the selected public land mobile network identity.

2. The method of claim 1, wherein the public land mobile network identity is stored in a list comprising one or more public land mobile network identities, wherein for each public land mobile network identity there is an associated zero or more closed access group identities which the user equipment is allowed to use in the public land mobile network identified by the public land mobile network identity.

3. The method of claim 2, wherein for each public land mobile network identity there is an indication that the user equipment is only allowed to access a 5G system via closed access group cells.

4. The method of claim 1, comprising:
   receiving a registration accept message; and
   deleting the indication that the user equipment is only allowed to access a 5G system via closed access group cells for the public land mobile network identified by the public land mobile network identity.

5. The method of claim 1, comprising:
   receiving a registration reject message; and
   retaining the indication that the user equipment is only allowed to access 5G system via closed access group cells.

6. The method of claim 1, wherein displaying the public land mobile network identity comprises displaying the public land mobile network identity associated with a list of one or more closed access group identities, wherein there exists a closed access group cell available to a user equipment in the public land mobile network identified by the public land mobile network identity, and wherein for each of the closed access group identities, it is indicated whether the user equipment is allowed for the closed access group identity.

7. The method of claim 6, wherein the list comprising the one or more closed access group identities includes a closed access group identity field, which is either populated with a respective closed access group identity if the entry has a closed access group identity, or is populated with an entry indicating a null closed access group identity if the entry does not have a closed access group identity.

8. The method of claim 7, comprising:
   displaying the public land mobile network identity without a list of one or more closed access group identities in addition to the public land mobile network identity displayed with a list of one or more closed access group identities.

9. An apparatus, comprising:
   at least one processor; and
   at least one memory including computer programs code, the at least one memory and computer program code configured to, with the at least one processor, cause the apparatus to perform:
   determining that a non-closed access group cell is available to the apparatus in a public land mobile network, wherein the public land mobile network is identified by a public land mobile network identity and the user equipment is only allowed to access the public land mobile network via one or more closed access group cells;

displaying the public land mobile network identity for user selection, wherein the displayed public land mobile network identity is associated with an indication that the user equipment is only allowed to access the public land mobile network identified by the public land mobile network identity via one or more closed access group cells;

receiving a user selection of the public land mobile network identity; and based on the received user selection, transmitting a registration request to the public land mobile network identified by the selected public land mobile network identity.

10. The apparatus of claim 9, wherein the public land mobile network identity is stored in a list comprising one or more public land mobile network identities, wherein for each public land mobile network identity there is an associated zero or more closed access group identities which the user equipment is allowed to use in the public land mobile network identified by the public land mobile network identity.

11. The apparatus of claim 10, wherein for each public land mobile network identity there is an indication that the user equipment is only allowed to access a 5G system via closed access group cells.

12. The apparatus of claim 9, wherein the apparatus is further configured to perform:

receiving a registration accept message; and deleting the indication that the user equipment is only allowed to access a 5G system via closed access group cells for the public land mobile network identified by the public land mobile network identity.

13. The apparatus of claim 9, wherein the apparatus is further configured to perform:

receiving a registration reject message; and retaining the indication that the user equipment is only allowed to access 5G system via closed access group cells.

14. The apparatus of claim 9, wherein displaying the public land mobile network identity comprises displaying the public land mobile network identity associated with a list of one or more closed access group identities, wherein there exists a closed access group cell available to a user equipment in the public land mobile network identified by the public land mobile network identity, and wherein for each of the closed access group identities, it is indicated whether the user equipment is allowed for the closed access group identity.

15. The apparatus of claim 14, wherein the list comprising the one or more closed access group identities includes a closed access group identity field, which is either populated with a respective closed access group identity if the entry has a closed access group identity, or is populated with an entry indicating a null closed access group identity if the entry does not have a closed access group identity.

16. The apparatus of claim 15, wherein the apparatus is further configured to perform:

displaying the public land mobile network identity without a list of one or more closed access group identities in addition to the public land mobile network identity displayed with a list of one or more closed access group identities.

17. A computer program embodied on a non-transitory computer-readable medium, the computer program comprising computer-executable code which, when executed in hardware, cause the hardware to perform a method comprising:

determining, by a user equipment, that a non-closed access group cell is available to the user equipment in a public land mobile network, wherein the public land mobile network is identified by a public land mobile network identity and the user equipment is only allowed to access the public land mobile network via one or more closed access group cells;

displaying the public land mobile network identity for user selection, wherein the displayed public land mobile network identity is associated with an indication that the user equipment is only allowed to access the public land mobile network identified by the public land mobile network identity via one or more closed access group cells;

receiving a user selection of the public land mobile network identity; and based on the received user selection, transmitting a registration request to the public land mobile network identified by the selected public land mobile network identity.

18. The computer program of claim 17, wherein the computer executable code is further configured to cause the hardware to store the public land mobile network identity in a list comprising one or more public land mobile network identities, and wherein for each public land mobile network identity there is an associated zero or more closed access group identities which the user equipment is allowed to use in the public land mobile network identified by the public land mobile network identity.

* * * * *